US007188179B1

(12) United States Patent
Hanson et al.

(10) Patent No.: US 7,188,179 B1
(45) Date of Patent: Mar. 6, 2007

(54) SYSTEM AND METHOD FOR PROVIDING SERVICE PROVIDER CHOICE OVER A HIGH-SPEED DATA CONNECTION

(75) Inventors: Paul Hanson, Kirkland, WA (US); David Hyams, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 646 days.

(21) Appl. No.: 10/036,315

(22) Filed: Dec. 26, 2001

Related U.S. Application Data

(60) Provisional application No. 60/257,404, filed on Dec. 22, 2000.

(51) Int. Cl.
*G06F 15/16* (2006.01)
*G06F 15/177* (2006.01)
(52) U.S. Cl. .................. 709/227; 709/228; 709/229
(58) Field of Classification Search ............... 709/223, 709/224, 225, 229, 227, 228
See application file for complete search history.

(56) References Cited

U.S. PATENT DOCUMENTS 6,151,628 A * 11/2000 Xu et al. .................... 709/225
6,295,291 B1 * 9/2001 Larkins ...................... 370/352
6,393,271 B1 * 5/2002 Dougherty .................. 455/411
6,430,276 B1 * 8/2002 Bouvier et al. ........ 379/121.01
6,577,643 B1 * 6/2003 Rai et al. .................... 370/466
6,603,758 B1 * 8/2003 Schmuelling et al. ....... 370/352
6,628,934 B2 * 9/2003 Rosenberg et al. ......... 455/411
6,675,208 B1 * 1/2004 Rai et al. .................... 709/224
6,721,306 B1 * 4/2004 Farris et al. ................ 370/352
6,732,176 B1 * 5/2004 Stewart et al. ............. 709/227
2003/0200321 A1 * 10/2003 Chen et al. ................. 709/229

FOREIGN PATENT DOCUMENTS

WO    WO 00/14919    * 3/2000

* cited by examiner

*Primary Examiner*—Rupal Dharia
*Assistant Examiner*—Brian J. Gillis
(74) *Attorney, Agent, or Firm*—Powell & Goldstein LLP

(57) ABSTRACT

A system and method enables a computer user to control his or her service provider for a high-speed data connection over a fixed wireless network. The system may present a list of service providers available for user registration and for each service provider for which the user registers, the system may store login information associated with the user and the registered service provider. Upon subsequent user login, the system may present a list of registered service providers to the user and upon the user choosing a service provider and clicking a connect button, the system may connect the user to the chosen service provider.

14 Claims, 7 Drawing Sheets

FIG. 5

INTERNET SERVICE PROVIDER SIGNUP PAGE

| LOGO | NAME | PRICE | REGISTER ON-LINE |
|---|---|---|---|
| WorldNet | AT&T WorldNet | $7.95 | http://www.at&tworldnet.net/register |
| @Home | @Home | $12.95 | http://www.home.com/register |
| AOL | America On-Line | $9.95 | http://www.aol.com/register |
| EarthLink | EarthLink | $9.95 | http://www.earthlink.com/register |

*FIG. 7*
PRIOR ART
200

SYSTEM AND METHOD FOR PROVIDING SERVICE PROVIDER CHOICE OVER A HIGH-SPEED DATA CONNECTION

CROSS-REFERENCE TO RELATED APPLICATIONS

This application claims the benefit of provisional U.S. Patent Application No. 60/257,404; filed Dec. 22, 2000, entitled "SYSTEM AND METHOD FOR PROVIDING SERVICE PROVIDER CHOICE OVER A HIGH-SPEED DATA CONNECTION."

This application is related to the following applications, assigned to the assignee of the present invention and incorporated herein by reference: by H. Chien et al., entitled "METHODS AND APPARATUS FOR USE IN REDUCING TRAFFIC OVER A COMMUNICATION LINK USED BY A COMPUTER NETWORK," U.S. Ser. No. 09/594,109; by H. Chien et al., entitled "REVERSE TUNNELING METHODS AND APPARATUS FOR USE WITH PRIVATE COMPUTER NETWORKS," U.S. Ser. No. 09/594,172.

BACKGROUND

The present disclosure relates generally to the field of computer networks, and more specifically to a system and method for enabling a computer user to control his or her connectivity to a network.

Computer users have a variety of means to gain access to Internet Service Providers (ISPs) or On-line Service Providers (OSPs) using high-speed data (HSD) connections. Many ISPs, OSPs and carriers have focused their attention on providing high-speed access while maintaining a simple Internet experience for users. One protocol used to accomplished the communication between a computer and a service provider is the Point-to-Point Protocol (PPP), which allows a host personal computer (PC) to connect to the Internet with a standard dial-up telephone line and a high-speed modem. Using PPP enables a computer to have a direct connection and use graphical front ends such as Netscape®.

An additional protocol associated with PPP is the Point-to-Point Protocol over Ethernet (PPPoE). PPPoE specifies how a PC interacts with a broadband modem (i.e., xDSL, cable, wireless, etc.) to achieve access to the growing number of high-speed data networks. Relying on two widely accepted standards, Ethernet and the point-to-point protocol, the PPPoE implementation requires virtually no more knowledge on the part of the end user other than that required for standard Dialup Internet access. In addition, PPPoE requires no major changes in the operational model for ISPs, OSPs and carriers.

The significance of PPP over Ethernet relates to its ease of use. PPPoE makes high-speed access easier to use for end consumers, and integrates more seamlessly into the existing infrastructure for carriers and ISPs or OSPs.

Also, PPPoE provides a major advantage for service providers by maximizing integration with—and minimizing disruption of—service providers' existing dial network infrastructures. Through tight integration with existing back office automation tools that ISPs have developed for dial customers, PPPoE enables rapid service deployment and cost savings. From authentication, accounting and secure access to configuration management, PPPoE supports a broad range of existing applications and services.

In a virtual private network (VPN) setting, tunneling, or accomplishing a secure and temporary path over the Internet Protocol (IP)-based network, may be accomplished using the PPPoE protocol. Tunneling is the process of encapsulating an encrypted data packet in an IP packet for secure transmission across the inherently insecure IT network. The point-to-point tunneling protocol (PPTP) enables the PPPOE to be used in the VPN setting and to enable secure remote access to corporate networks over the Internet. For remote access, PPTP creates a "tunnel" directly to a corporate server (such as a Windows NT server) on a network.

However, there are disadvantages of the PPPOE protocol for a VPN. Not all ISPs enable the use of the PPPoE protocol. If a computer user is choosing between various ISPs, he or she often must contact the ISP to determine whether they regulate dynamic host configuration protocol (DHCP) to assign an IP address. If the particular ISP does not support the PPPOE protocol, then a user cannot choose that ISP if he or she desires to use the PPPOE protocol. Further, if various ISPs are used at different times by a user, then a discontinuing exists when choosing different ISPs that support different protocols.

Furthermore, when using a PPPOE protocol for high-speed Internet access, the user is restricted to that standard and cannot connect to gateways other than the ISP that supplied the PPPOE client on the user's remote PC.

A related art network 200 is shown in FIG. 7, which illustrates a high-speed data network model illustrating the needs in the art for the invention disclosed herein. First, a basic fixed wireless system is illustrated with a personal computer 210 communicating through a fixed wireless means (not shown, but generally discussed in further detail below) with a base station 212. The base station 212 communicates signals to and from a distributed system network (DSN) 214, which in turn communicates signals through a backbone infrastructure such as, for example, AT&T's CerfNet® backbone. The user of the personal computer 210 may access the Internet 218 and his or her corporate account 220 or other ISPs or GSPs 222, 224.

A more traditional network is also disclosed in FIG. 7 with a mobile user computer device 202 communicating via a telephone line with a local exchange carrier switch 204. The switch 204 communicates with a modem pool 206 used to establish communication with the mobile user computer 202. A service provider 208 may be, for example, AT&T's WorldNet®. The service provider 208 will typically include a web site server 226, email and news server 228 and an authentication and account information server 230 for governing security and consumer issues.

The service provider 208 also communicates with a CerfNet® server 216 for allowing the mobile computer 202 to access a corporate intranet 220, ISP or OSPs such as AOL®, Yahoo®, etc. One deficiency in this system is that the user, whether using a fixed wireless connection or a standard connection, cannot simply choose from a predetermined list of ISPs, OSPs or a corporate intranet.

In addition to the high-speed network arrangements discussed above, another model, called the "wholesale access model," provides access to high-speed data connections to various ISPs. In this model, each ISP leases HSD connections and markets, sells, bills and supports the data offerings for each customer for the ISP service.

In this regard, the customer's HSD data pipe is dedicated to the single ISP that leases that connection to provide service to the user. Each dial-up connection from the user is the responsibility of the respective ISP. This provides an open access model for the user but prevents the user from easily switching between ISPs and forces each separate ISP to independently handle account registration and authentication.

Overall, there is a need for a method and apparatus that solves the above problems while supplying the above benefits, as well as providing other advantages.

BRIEF DESCRIPTION OF THE DRAWINGS

FIG. 5 illustrates a suitable page through which an ISP may be signed up.

Figure 7:
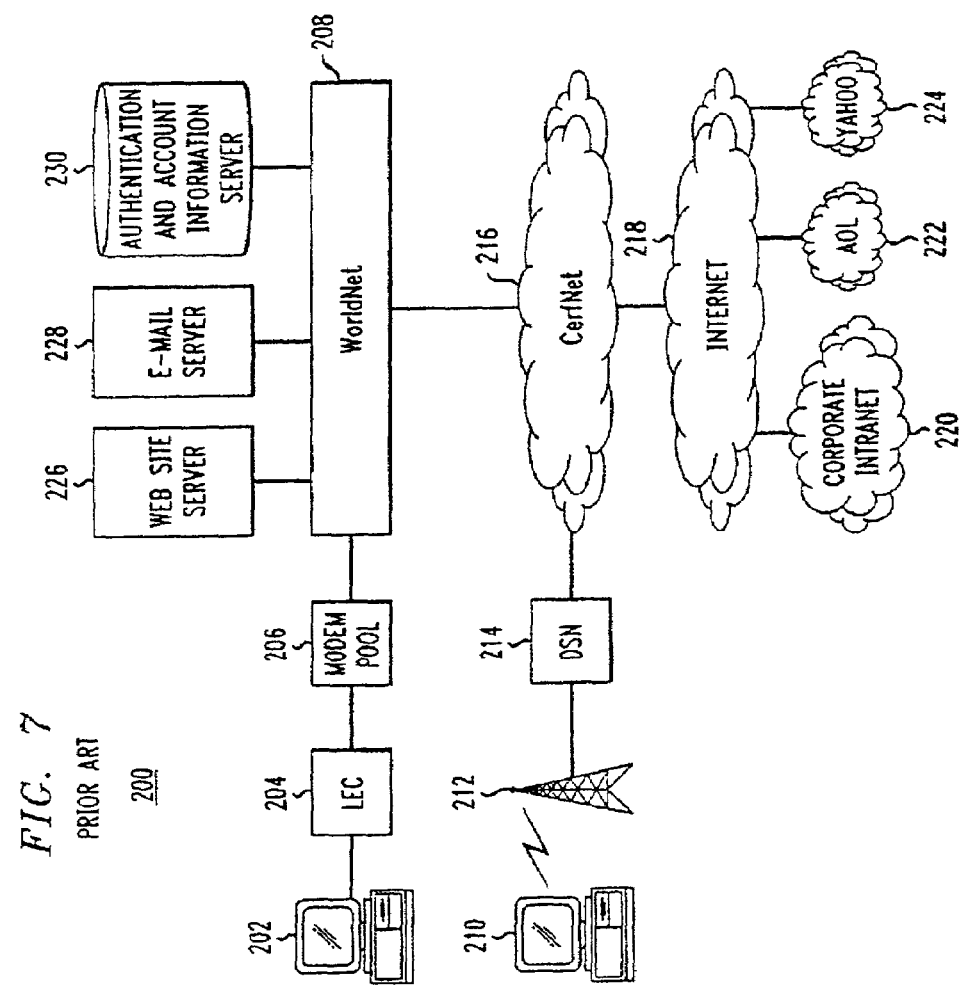

FIG. 7 shows a prior art network model for connecting to multiple ISPs.

In the drawings, the same reference numbers identify identical or substantially similar elements or acts.

Figure 1:
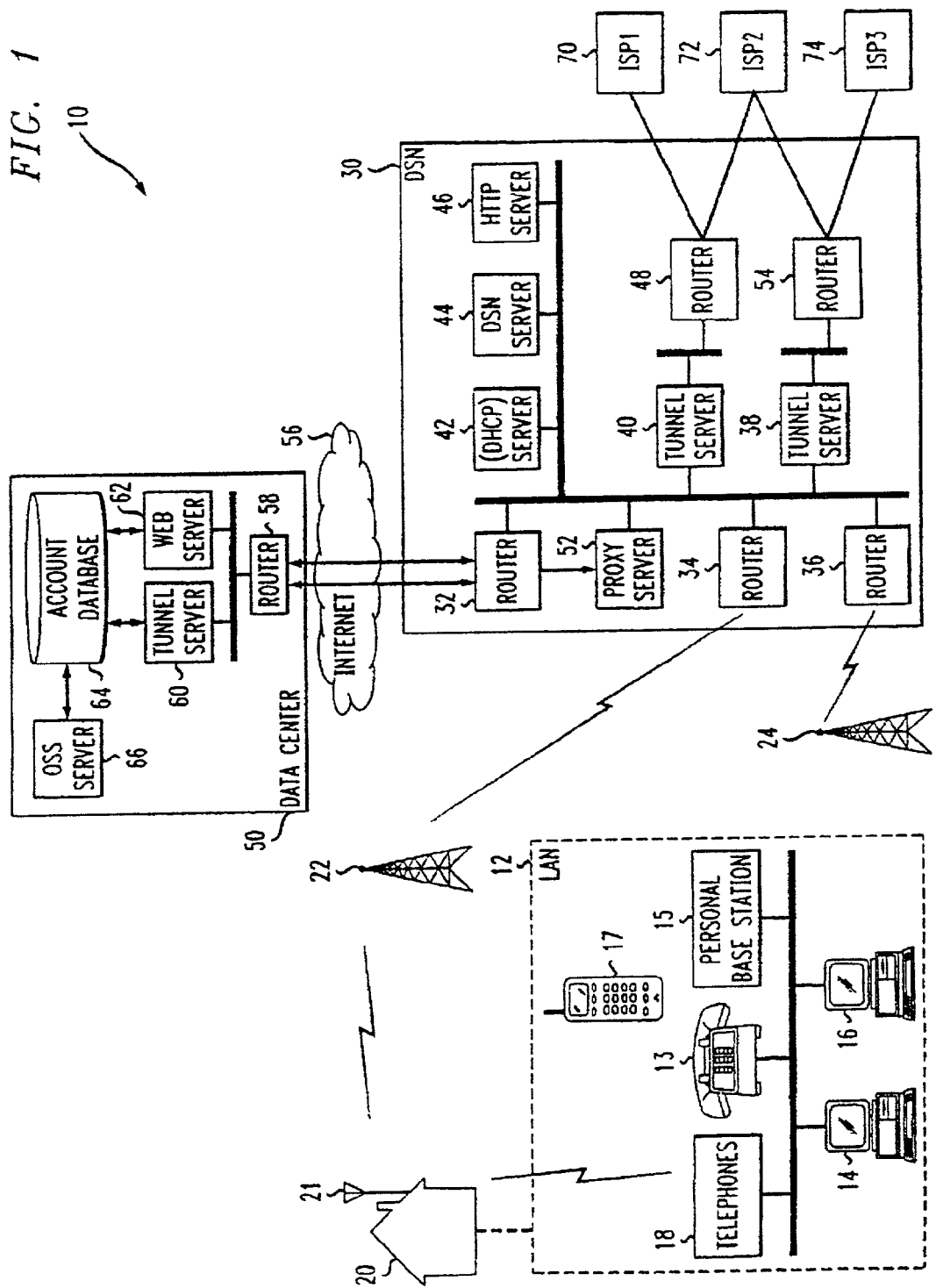
FIG. 1 illustrates a network providing ISP choice.

Note: the headings provided herein are for convenience and do not necessarily affect the scope or interpretation of the invention.

DETAILED DESCRIPTION OF THE INVENTION

What is needed in the art is an IP-based computer network system wherein a user may, in a simple and efficient manner, choose among the various service providers over a high-speed Internet connection. Furthermore, what is needed in the art is a high-speed Internet access system and method that does not constrain a user to a specific gateway but enables the user a choice of ISPs and OSPs while maintaining the high-speed connection. In this regard, the ISP access to an individual's house or business is not exclusive, but different users may have simultaneous sessions to different ISPs from the same virtual private network (VPN). The need for these services is especially important in the fixed wireless connection scenario. The present disclosure will use "ISP choice" or similar language as a short-hand term which may refer to only an ISP choice but also may refer to choosing between various ISPs, OSPs, corporate intranets, other networks or access points, or other service provider options presently or not presently available.

In addition, what is needed in the art is an improved overall user experience with HSD connections. This includes the ISP choice functionality discussed above, but also includes the ability to interface with tools, registration of various services, utilities, authentication and other needs related to the HSD experience. The present invention may increase the ease of use and the user's experience by providing "persistent client" software installed on a client computer for managing and integrating the necessary services for HSD communication. The present invention provides a "thin" client which may group three functions—registration, activation and authentication to a single network node to simplify the entire process for the user. The thin client enables the user to command, control and interact with the PPTP VPN network connection and the registered applications, tools and utilities.

To address the deficiencies in the "wholesale access model" of HSD access, the present invention enables customers to purchase the HSD transport means from a single source that provides access to various ISPs. The single source and the various ISPs can market, sell, bill and support their various pieces of the system. The HSD data pipe according to the present invention may be used to access multiple ISPs.

In order to address further the deficiencies in the prior art, the invention disclosed herein is proposed. Disclosed embodiments of the present invention enables a remote computer or a thin client in a virtual private network to have a single VPN connection to the network and yet provide the user with multiple choices of ISPs. The so-called "persistent client," installed on the remote computer, may receive automatic software updates and supports multiple ISPs each having the same high-speed data connection. For example, a user may be able to choose via the persistent client from America Online®, Earthlink®, WorldNet® or @Home® from the same client software interface. In addition, telecommuting may be simplified by corporate intranets being included as an another option to the ISPs in the ISP selection page.

During the installation process for the persistent client, the user may be presented with the option to complete and submit ISP account registration information. Each ISP that is available for being chosen may provide its interface and account activation files to the user for registration with the respective ISP. In this manner, the persistent client can enable the user to enhance and simplify his or her HSD experience.

According to a first embodiment, a system for enabling a computer user to select from a plurality of service providers using a single high-speed data connection is provided. The system is capable of connecting a computer device having a client application with a user-selected service provider. The system may comprise a distributed system network having at least one receiving router for receiving communication from the computer device and at least one tunnel server. Each tunnel server would connect the at least one receiving router with at least one transmitting router. The at least one transmitting router communicates with at least one service provider, wherein the computer user may select, using the client application, a service provider from a plurality of available service providers using a single high-speed data connection. The system may further comprise a VPN tunnel connection entry that is automatically configured for each ISP in a windows dial-up networking scenario.

Another embodiment comprises a method of enabling a user to choose a service provider from a list of service providers in a fixed wireless high-speed data environment. The method comprises presenting a list of service providers available for user registration and for each service provider for which the user registers, and storing login information associated with the user and each registered service provider. Upon subsequent user login, the method may further comprise retrieving the stored login information for a chosen service provider and, upon the user clicking a connect button, connecting the user to the chosen service provider over the fixed wireless high-speed data connection.

The following description provides specific details for a thorough understanding of, and enabling description of, embodiments of the invention. However, one skilled in the art will understand that the invention may be practiced without these details. In other instances, well-known structures and functions have not been shown or described in detail to avoid unnecessarily obscuring the description of the embodiments of the invention.

As noted above, what is needed in the art is a consistent and easy-to-use interface for a user's high-speed data (HSD) experience. For example, in the fixed wireless context, at least one embodiment may enable a user to command, control and interact with their point-to-point tunnel protocol (PPTP) virtual private network (VPN) network connection and any other registered applications, tools and utilities. A persistent client may be programmed and installed in such a way as to be invoked through Microsoft Windows or other user interface and may be accessed, for example, by a pop-up menu or via a mouse click. In order for various applications to interface with the persistent client framework, simple ASCII text files that contain settings and parameters for determining how to interface with the application may be provided. These may be called "parameters files" and typically may be identified through the extension "PRM." The parameter files are used by applications to register or sign-in with the persistent client interface disclosed herein. The parameter files include information such as the application name that should appear on pop-up menus as well as the name and location of the applicant's executable file.

The persistent client according to one embodiment of the present invention may be installed from a web site and downloaded over the Internet into a single download file for execution of a setup program. In another embodiment, a CD-ROM may also be provided which is readable by target client platforms and which includes the client application and setup software in, for example, Microsoft Windows, Macintosh, or UNIX file formats. The specific platform format is not important in the present disclosure in that the client application may be installed on existing or future platforms as necessary. The CD-ROM will store the setup files for the client application according to an aspect of the present invention. The client application operates the steps of accomplishing an aspect of the present invention as explained herein.

In one embodiment, in order for an application to integrate into the persistent client framework, a valid shortcut name and location may be supplied within the application parameter file (app_name.prm). The application may be considered registered as soon as the appropriate parameter file is stored in the appropriate windows folder.

We turn to FIG. 1, which illustrates a network 10 according to a first embodiment of the present invention. We assume that the client application discussed above has been previously installed on the client platform computer device. A user may use various high-speed data tools for controlling his or her high-speed data connection. An Internet Service Provider (ISP) choice in a fixed-wireless network context may also be provided. The general principle of ISP choice as described herein may also have applicability in other network contexts in addition to the fixed-wireless context. Accordingly the present disclosure is not limited to only the preferred embodiment described herein. As mentioned above, "ISP choice" in the present disclosure may also be applied in a broader context to mean choice between ISPs, OSPs, corporate intranets, etc.

In a fixed-wireless local loop, a local area network (LAN) 12 can cover a single home 20 having home computers 14, 16 or the like, telephones 18, and perhaps a personal base station 15 and a wireless device 17 such as a mobile phone. These various devices communicate through an air-interface (in the case of the personal base station) or the wiring of the home 20 with an "angel box" 18, through an angel antenna 21 positioned on the house 20 to transmit and receive signals. The angel antenna and transmission is often referred to as a remote unit (RU). An angle box is similar in operation to a hub and when installed in a home or office and wired to the existing phone wiring, allows a user to have an HSD route to any telephone line in the home or office.

Rather than communicating with the network through a wire-line connection, a fixed-wireless LAN communicates via an air-interface with a base station 22, 24. The fixed-wireless communication enables a HSD connection with the advantages of high-speed and without the need to lay fiber-optic or other wired connections. The basic construction of the fixed wireless system is known to those skilled in the art and not discussed in more detail herein.

The base stations 22, 24 communicate with a distributed system network (DSN) 30 which comprises access routers 34, 36, a proxy server 52, a router 32, tunnel servers (TS) 38, 40, routers 48, 54 communicating with various ISPs 70, 72, 74. Three ISPs are illustrated but no specific number is required according to the invention.

A dynamic host configuration protocol (DHCP) server 42 provides the TCP/IP protocols that enable PCs 14, 16 to get temporary or permanent IP addresses out of a pool from centrally administered servers. The Domain Name Server (DNS) 44 and hypertext transfer protocol (HTTP) server 46 enable the home computer device to resolve domain names to IP addresses and communicate data over the Internet and are shown as part of the DSN 30. Routers 48 and 54 each communicate with various ISPs 70, 72, and 74. Router 32 communicates with a corporate data center 50.

The data center 50 comprises a router 58 communicating with router 32 of the DSN 30 through operations support systems (OSS) Net/Secured Internet connection, including a generic routing encapsulation (GRE) tunneling connection between router 32 and router 58. The GRE tunnel provides a secure connection through the Internet 56 by providing for the encapsulation of one packet of data inside another packet of data. The original data packet becomes the "payload." The tunnel servers 60, 52 encrypt the payload and continuously authenticate the identity of the communicating machines on a packet-by-packet basis. A member services web server 62 is also provided. The member services web server 62 and server 60 communicate with an account database 64 via a structured query language (SQL) interface. An OSS server 66 also communicates via an SQL interface with the proprietary account database 64.

Using the GRE tunneling communication enables the creation of a virtual private network (VPN) between the home LAN 12, base stations 22, 24, routers 34, 36, the proprietary database 50 through the Internet 56, and DHCP server 42, DNS server 44 and HTTP server 46.

According to the first embodiment of the present invention, a "persistent client" is installed on computer devices 14, 16 and provides many advantages to a home computer user. One goal of the persistent client is to control and monitor the high-speed data connection in the fixed wireless network, including access to various ISPs. The persistent client may provide users with a choice among the various ISP providers on a home page for users with fixed-wireless HSD service.

Further, improved account maintenance, customer service, and other advantages may be realized by using a persistent client. Generally, the persistent client is installed on a user's PC 14, 16 at the time a fixed-wireless service is established. The persistent client may be a "thin" client that can reside on the personal computer 14, 16 and may offer choices of ISPs for on-line signup and connection.

Figure 3:
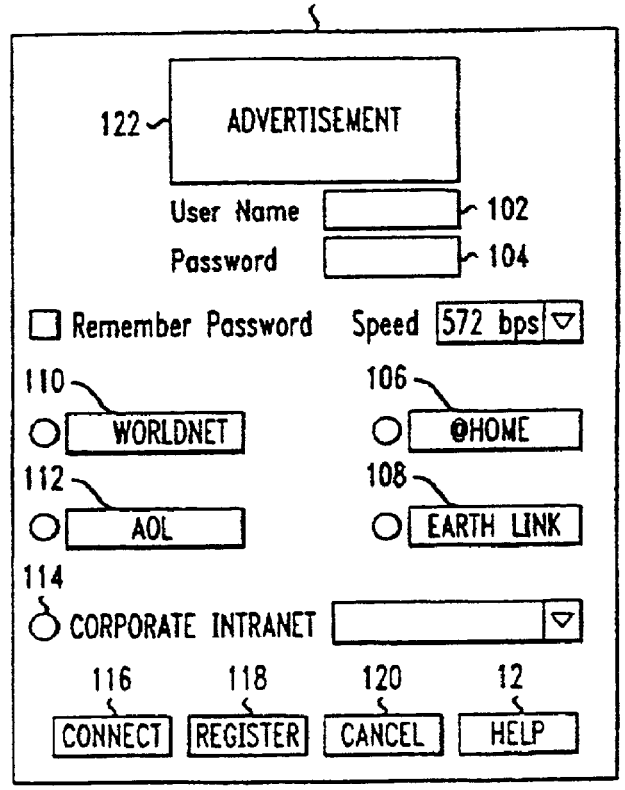
FIG. 3 illustrates a suitable page from which a user may choose an ISP, OSP or corporate intranet.

The user must typically register for each ISP, and after registration and upon login, authentication of the user's name and password is accomplished. Embodiments of the present invention enable the user to register for multiple ISPs. The user's chosen passwords and login names may be stored in a network node in the DSN 30. This data may also be stored in another location in the network 10. Storing the registration and authentication data in a network node in the DSN 30 or other central location simplifies the ISP choice. Each ISP may require its own password and login name. When a user has registered for, say, four ISPs and enters in the required login names and passwords for the respective ISPs, this information may be centrally stored in the DSN 30. Then, as a user is presented with a plurality of ISPs from which to choose, as an ISP is selected, the password and login name associated with that ISP may be automatically populated to a name field and a password field, as is shown in FIG. 3.

In this manner, the registration, activation and authentication processes may be combined using the single data service described herein. This method and system simplify the entire process and provides the computer user with easily accessible options for ISPs over a high-speed data network.

The registration process described herein may be accomplished through the ISP itself providing the data entry fields for the computer user to register. Otherwise, a DSN 30 operator may act as an agent and operate and present the computer user with such data fields in order to allow the computer user to register for the respective ISP.

Unless described otherwise below, the construction and operation of the various blocks shown in FIG. 1 and the other Figures are of conventional design. As a result, such blocks need not be described in further detail beyond that provided herein, because they will be understood by those skilled in the relevant art. Such further detail is omitted for brevity and so as not to obscure the detailed description of the invention. Any modifications necessary to the blocks in FIG. 1 (or other Figures and embodiments) can be readily made by one skilled in the relevant art based on the detailed description provided herein. Much of the detailed description provided herein is explicitly disclosed in the provisional patent application; and much of the additional material of aspects of the invention will be recognized by those skilled in the relevant art as being inherent in the detailed description provided in such provisional patent application, or well known to those skilled in the relevant art. Those skilled in the relevant art can implement aspects of the invention based on the Figures and the detailed description provided in the provisional patent application.

Figure 2:
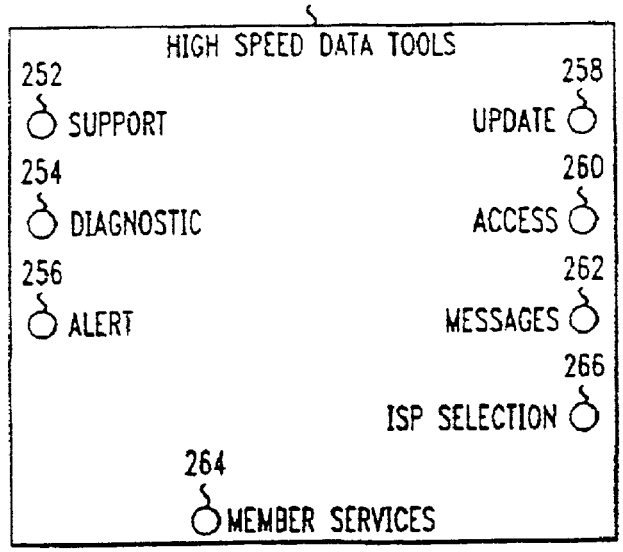
FIG. 2 illustrates a suitable page from which a user may choose various options associated with high-speed data transmission.

In one embodiment, the centralized persistent client interface is shown by way of example in FIG. 2. From the top-level menu screen 250, a user may access a variety of the tools and applications noted above. Various links from the persistent client interface include support 252, diagnostic 254, alert 256, update 258, access 260, ISP selection 266 and messages 262. The ISP choice page 100 discussed below is reached through clicking on the ISP selection button 266 shown in FIG. 2. Typically, the user will use the persistent client to access the various tools and utilities installed on the client PC 14, 16 and to access a remote server via a PPTP VPN network connection. The persistent client may be a thin client application framework used to command, control and generally interact with a PPTP VPN network connection and its registered applications and utilities.

The high-speed data tools that may be available to help a user diagnose communication/network problems and help the user understand related topics are next described. The "Access" 260 option refers to an access tool, such as the "net-light" access tool. This is an application that monitors network connectivity to insure that the fixed wireless high-speed data service is operational and available. This application may provide a network connection monitoring and diagnostic tool, and may run tests on the network connection at regular intervals or upon request. For example, this may provide a simple visual indication that the user can connect to the network services, including the thin ISP service. This tool may log connectivity results to a plain ASCII text file which may be reviewed to confirm network availability and which may be emailed to a customer care organization to assist in problem resolution. After the application begins to run, it may appear as a Windows system tray icon or provide another indication that the application is running. In one embodiment, the icon associated with the system tray is a stoplight icon.

The message button 262 provides a message link, such as a link to an HSD "net-message" access tool. This tool may provide information to the user such as the "message of the day." This tool also may send time sensitive but non-critical information to the users. The update button 258 selects an HSD "net-update" access tool. This tool provides information to the user about updated software components available for download and installation, and may appear in the Windows tray after startup or provide another indication that the application is running. The alert button 256 refers to the HSD "net-alert" access tool. This provides information to the user such as network alerts and bulletins. These may include network status and network problems.

The diagnostic menu selection 254 refers to an access tool, such as the HSD "net-diagnostic" access tool. This application may provide the user with a method to remotely diagnose network problems. The support button 252 links to the HSD "net-support" access tool. This tool provides an electronic communication medium to let the user contact customer support regarding problems.

The member services button 264 links the user to a thin-ISP member services page. This allows subscribers to the thin-ISP to change passwords or update other personal information such as email address. The ISP session selection button 266 links to a tool that enables VPN connections to the various ISPs. The linked page accessible from the ISP selection option 266 is shown in more detail in FIG. 3.

Other tools may be available for selection. For example, a support tool could be accessible by a support button, where the support tool allows a customer to contact customer support via an electronic medium. One skilled in the art will recognize that many types of modules or tools could be incorporated, such as buddy lists, an update module to download updates software components, etc.

FIG. 3 illustrates a suitable sign-in page for providing the computer user with choice of ISPs according to an embodiment of the present invention. As discussed above, the page shown in FIG. 3 is obtained through the ISP session link button 266 shown in FIG. 2. The ISP session initiation may enable a session-by-session choice of ISP, rather than having each ISP with a separate connection to the home 20. The interface 100 may include a field for a user to enter a username 102 and password 104. This provides a locally editable box whose data is stored in a local text file. These data fields may be populated during the registration process for the ISPs. As shown, other common features of a sign-in page may be provided such as a box to check for remembering the password and a choice of speed for the connection. In addition, various ISPs, OSPs or corporate intranets 106, 108, 110, 112 may be listed on the interface. The listing or optional choices for the ISP sessions are created using JAVA radio buttons in one embodiment, but it is not important to the present invention how the interface is specifically designed.

The ISP choices may be populated during the registration process for each and include each ISP brand logo. Corporations that participate may also be able to include a corporate intranet connection 114. This is a locally editable combination box that has data stored in a local text file and which is also populated during the registration process. This enables the employer to give the employees easy intranet access.

In one embodiment of the persistent client interface a user may choose from the participating ISPs, OSPs or the corporate intranet from a single page. This sign-in page 100 may be related to a regional Bell operating company (RBOC) DSL-ISP interface using point-to-point protocol (PPP) over a layer 2 tunneling protocol (L2TP) tunnel. A connect button 116 may connect the user to the chosen ISP or corporate intranet. The connect button 116 may be a JAVA push button in one embodiment and may only be enabled to complete the connection when the connection information is complete. A register button 118 may provide the user with an opportunity to register with other ISPs as will be shown in more detail in FIG. 5. The register button 118 may launch the ISP/OSP registration window shown in FIG. 5. A cancel button 120 may be a standard JAVA button to close the window and a help button 121 may provide user help on how to navigate the system using local help content.

One advantage of the multiple ISP access through using the persistent client of the first embodiment of the present invention is that sessions to different ISPs may be simultaneously instigated from different users in the same house 20. Through the register button 118, participating ISPs may easily be signed-up for by the user and added to the ISP/OSP choice web page 100. An advertisement or other information may be provided in a banner portion 122 of the web page 100.

When the register button 118 is clicked from the ISP choice web page 100, an Internet Service Provider Sign-up Page 130 appears. This sign-up page lists participating ISPs 132 and enables the user to click on an ISP and be connected to the ISP on-line registration process. After a user registers with the chosen individual ISPs, an icon associated with that ISP is added to the list of ISPs on the ISP choice web page 100 as shown in FIG. 3. For example, from the registration page 130, suppose that WorldNet® is chosen by the user. Next, the WorldNet® registration page would be displayed to the user in which name, address, login account names/passwords and secret words are entered and submitted as on-line registration data. Since each ISP has various and differing registration pages, this web page is not illustrated here.

Next, suppose that the user registers for the four ISPs illustrated in FIG. 3. In this case, the user name and password for each different ISP may be stored in a database. For each ISP listed on the ISP choice web page 100, the associated user name and password for a chosen ISP may be automatically entered into the username field 102 and password field 701, respectively. In this embodiment, the user would only need to click on an ISP and then click on the connect button 116 to connect to that ISP. Once an ISP is chosen by the user, the username and password information may already be pulled from a database or a "cookie" residing on the computer 14, 16 and entered into the respective data fields 102, 104. Then, as the connect button 116 is clicked, a session with the chosen ISP is initiated.

Further, in addition to the list of ISPs on the ISP choice page 100, corporations may easily be able to provide access to a corporate intranet 114 which also may be chosen from the ISP choice page 100. Similarly, if the corporate intranet 114 is highlighted, then clicking the "connect" button initiates a session with the corporate intranet.

The persistent client software may be installed on a computer 14, 16 either via an automated remote installation via a browser or FTP located on the client PC 14, 16. CD-ROM media or other storage media may also be used to install the persistent client. An advantage of the persistent client is that it may be updateable via a TCP/IP connection (or other remote connection) with a remote server.

In addition to being able to offer a choice of ISPs and corporate intranets, the persistent client may also act as a centralized host interface to a variety of applications, tools, and utilities. The persistent client may use a customer hypertext markup language (HTML) browser wherein users can access applications hosted by the persistent client through double clicking the mouse on an icon located in a Windows task tray or providing another indication.

Figure 4:
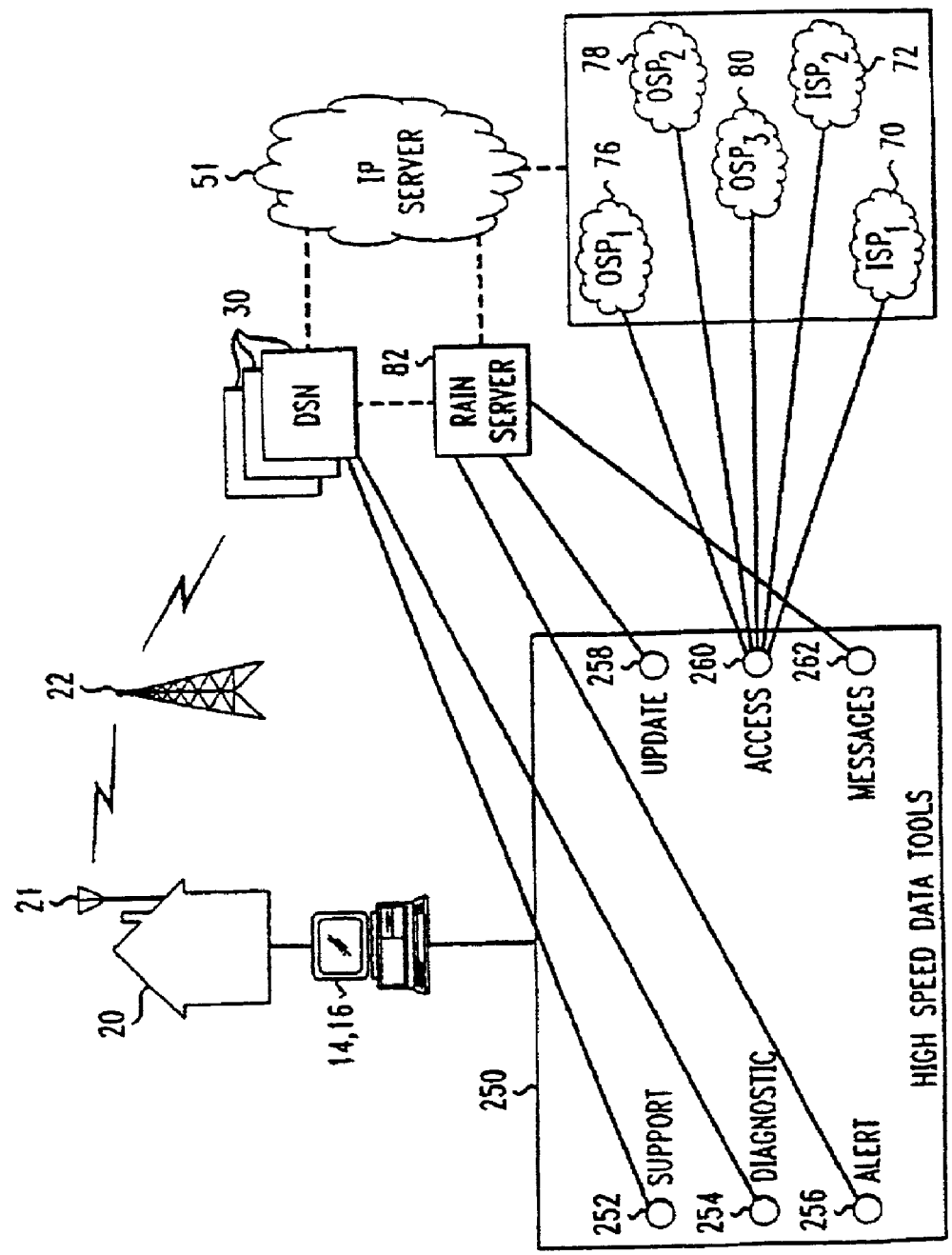
FIG. 4 illustrates further details regarding the options that may be chosen from the page illustrated in FIG. 2.

Next, the top-level access page 250 shown in FIG. 2 is illustrated in more detail for the resulting choices that may be chosen from the page 250. As shown in FIG. 4, the PC 14, 16 or other communication device within the home 20 communicates via an antenna 21 with a base station 22 and the DSN 30. The DSN 30 communicates with a RAIN server 82 and an IP server 51. The support 252 and diagnostic 254 options from the access page 250 may connect a user to various DSN servers 30 for response. The alert option 256 connects the user to a RAIN server 82 that may provide alert information. The update option 258 connects the user to the RAIN server 82 for information, as well as the message option 263. The access option 260 may enable the user to connect, through the page shown in FIG. 3, to various on-line service providers 76, 78 and 80 or various internet service providers 70, 72. Not shown here is a corporate intranet to which a user may also connect using the disclosed client application. In this figure, the access option 260 includes the functions described above for both the access option 260 and the ISP selection option 266 shown in FIG. 2.

FIG. 5 shows a suitable page 120 for signing up an internet service provider. This page, entered through the register button 118 on the ISP choice page 100, enables the user to register on-line for a variety of ISPs 132. By way of example, the ISP logo, name, price (per month of service) and on-line registration URL are shown, although registration for each ISP may vary from the specific manner shown in FIG. 5. The disclosure in FIG. 5 teaches one example of the concept that a user may use a single web page to sign-up for a variety of ISPs.

After the user registers for all the chosen ISPs, when the system presents the user with the various ISPs from which to choose and the user makes a selection, the system forms an outside tunnel connection (OTC) to enable the computer device to connect to the chosen ISP. Each time an OTC is created, the system may present an audio/video multi-media or other message to the computer user. The message may be stored locally or on a network server for downloading to the computer device. In this manner, a branded message may remind the computer user of the source of his or her HSD connection. This provides one of many opportunities for the provider of the thin client to provide a branding message, build a presence on the desktop, etc. The branding message may be persistent, so that the user sees it often, but it most cases it should not be persistent as to be annoying. The provider of the thin client can therefore build brand awareness without providing the ISP functionality. In one embodiment, the file with the message loads in less than 5 seconds and the audio/video presentation is between 5–10 seconds, although a different length of time may be used.

Figure 6A:
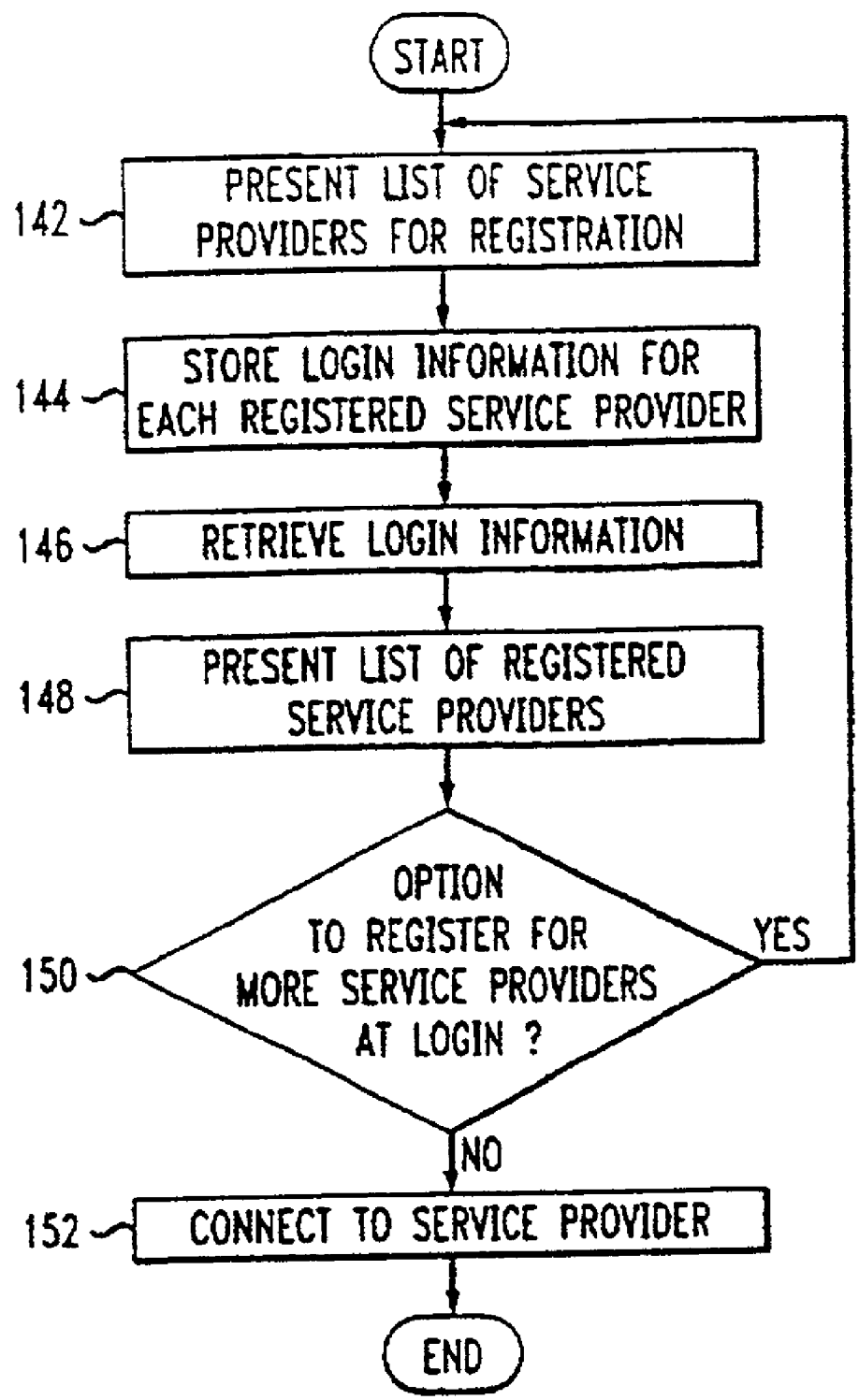
FIG. 6A illustrates a method for enabling a user to register for various ISPs according to an embodiment of the present invention.

Another embodiment of the present invention is shown in FIG. 6A and comprises a method for enabling a user to choose a service provider from a list of service providers. The method begins with presenting a list of service providers available for user registration 142. This is preferably accomplished when the user selects the register button 118 shown in FIG. 3. An example of a list of service providers is shown in FIG. 5. For each service provider for which the user registers, the method may comprise storing login information associated with the user and each registered service provider 144. The information may be preferably stored in a network node associated with the DSN 30. However, other network or local storage locations may be provided. The login information, i.e., at least the password and login name, would be accessible to the client application.

Upon subsequent user login, the method may comprise retrieving the stored login information for each registered service provider 146, presenting a list of registered service providers to the user 148 and upon the user choosing a service provider and clicking a connect button, connecting the user to the chosen service provider 152. This method simplifies the login process when the user desires to access multiple service providers, such as internet service providers, on-line service providers or corporate intranets.

In one embodiment, the method of enabling a user to choose a service providers is associated with a fixed wireless high-speed data environment and is initiated by the client application on the local computer device. The method further may comprise presenting the user with an option to register for other service providers while the client application presents the list of service providers available for user login 150. This may be preferably accomplished using, as discussed above, the register button 118 on the ISP selection page 100 shown in FIG. 3. By choosing the register button 118, the ISP signup page 130 shown in FIG. 5 is presented to the user 142 so that the user may register for service providers or additional service providers.

Figure 6B:
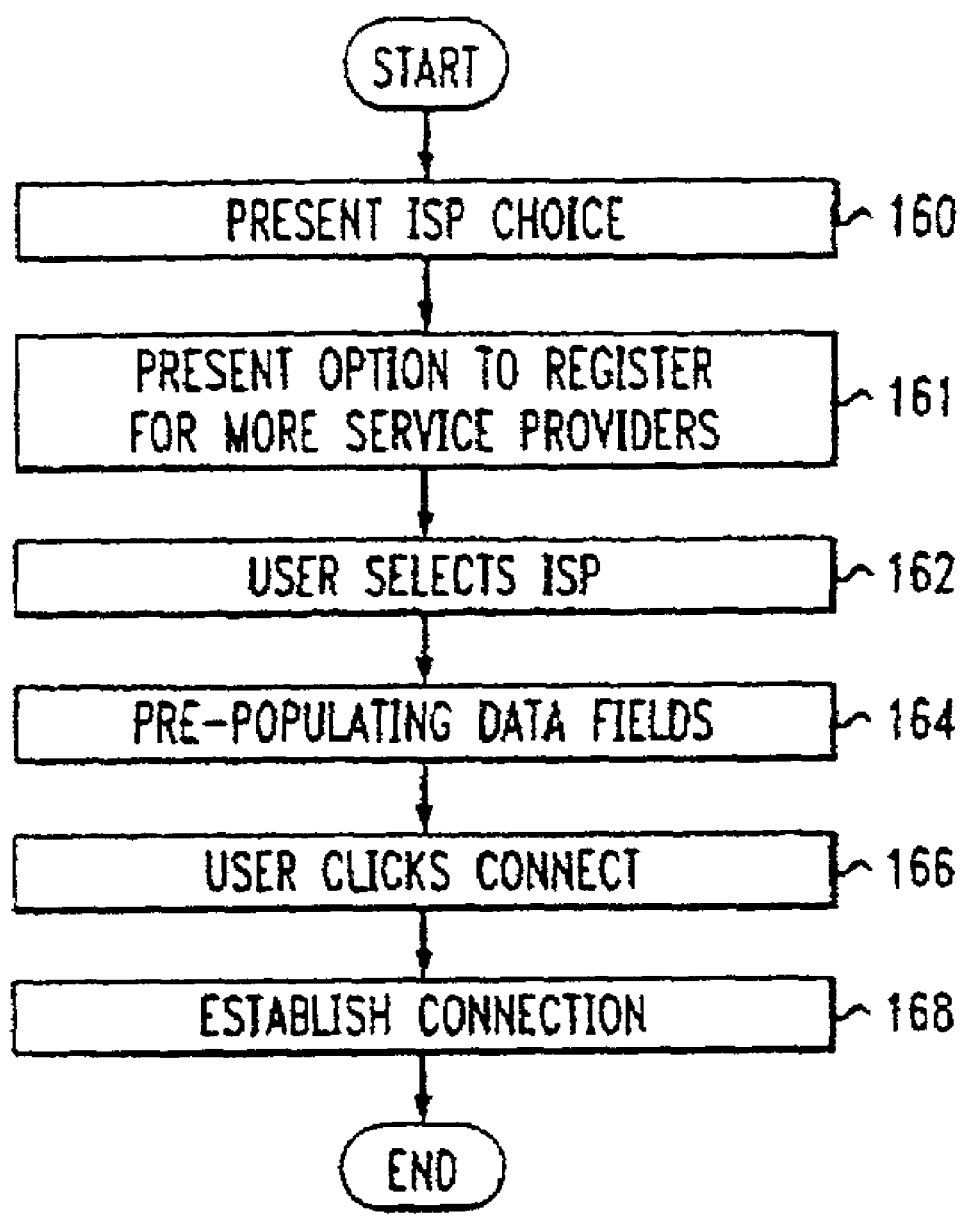
FIG. 6B illustrates a method for enabling a user to choose and connect to an ISP according to another embodiment of the invention.

In a variation on this embodiment of the invention shown in FIG. 6B, the method of enabling a computer user to choose a service provider from a list of service providers comprises presenting the computer user with the list of service providers from which to choose 160. Upon the user selecting a service provider from the list of service providers and clicking a connect button 166, the method further comprises establishing a connection between a computer device operated by the computer user and the selected service provider 168. The step of presenting the computer user with the list of service providers from which to choose may further comprise presenting the computer user with an option to register for additional service providers 161.

The method of enabling a computer user to choose a service provider from a list of service providers may further comprise pre-populating a name field and password field with stored information associated with the selected service provider 164 when the user selects a service provider from the list of service providers. The step of establishing a connection between a computer device operated by the computer user and the selected service provider may be accomplished using the PPPoE protocol.

In yet another variation of the invention disclosed herein, aspects of the present invention further comprises a method of enabling a user to connect to a chosen service provider from a list of service providers 162. The method comprises displaying the list of service providers from which the user may choose and after a user has chosen a service provider, in response to a single action being performed, connecting the user to the chosen service provider. This may simplify the process of choosing and connecting to various ISPs over a HSD line. In another alternative embodiment, the method further comprises displaying a list of registratable service providers for which the user may register and add service providers to the list of service providers from which the user may choose in response to a single action by the user.

In one embodiment, the methods disclosed herein are associated with a fixed-wireless high-speed data network. The principles and concepts associated with aspects of the present invention, however, may be applicable to other networks in addition to fixed-wireless networks.

Other wire-line or other networks, whether virtual private networks or otherwise, may also employ and utilize the inventions disclosed herein.

Those skilled in the relevant art will appreciate that the invention can be practiced with various telecommunications or computer system configurations, including Internet appliances, hand-held devices, wearable computers, palm-top computers, cellular or mobile phones, multi-processor systems, microprocessor-based or programmable consumer electronics, set-top boxes, network PCs, mini-computers, mainframe computers, and the like. Aspects of the invention can be embodied in a special purpose computer or data processor that is specifically programmed, configured, or constructed to perform one or more of the computer-executable instructions explained in detail herein. Indeed, the term "computer", as used generally herein, refers to any of the above devices, as well as to any data processor. Data structures and transmission of data particular to aspects of the invention are also encompassed within the scope of the invention. In general, while hardware platforms such as stationary and mobile devices are described herein, aspects of the invention are equally applicable to nodes on the network having corresponding resource locators to identify such nodes.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application. Use of the term "or," as used in this application with respect to a list of two or more items, shall be interpreted to cover any, all, or any combination of items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The teachings of the invention provided herein can be applied to other systems, not necessarily the system described herein. In general, the terms used in the following claims should not be construed to limit the invention to the specific embodiments disclosed in the specification, unless the above detailed description explicitly defines such terms. The various embodiments described herein can be combined to provide further embodiments. These and other changes can be made to the invention in light of the detailed description. Accordingly, the actual scope of the invention encompasses the disclosed embodiments and all equivalent ways of practicing or implementing the invention under the claims.

Incorporated by reference herein are all above references, patents, or applications. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

We claim:

1. A system for enabling a computer user to select from a plurality of service providers using a single high-speed data connection, the system being capable of connecting a computer device having a client application with a user-selected service provider, the system comprising:
   a distributed system network having at least one receiving router for receiving communication from the computer device having the client application; and
   at least one tunnel server, each at least one tunnel server connecting the at least one receiving router with at least one transmitting router, the at least one transmitting router communicating with at least one service provider,
   wherein the computer user can select, using the client application, a one service provider from a plurality of available service providers using a single high-speed data connection via the at least one tunnel server, before the computer device with the client application is connected to a network associated with the one service provider.

2. The system according to claim 1, wherein each service provider may be an internet service provider, an online service provider, or a corporate intranet service.

3. The system according to claim 1, wherein the client application presents a selection page listing the plurality of service providers.

4. The system according to claim 3, wherein the client application further comprises a registration service wherein the computer user may register for a service provider from the plurality of service providers.

5. The system of claim 4, wherein registration and authentication for each service provider for which the computer user registers is populated to the distributed system network.

6. The system according to claim 5, wherein data communicating between the computer device and the receiving router occurs through a fixed wireless network.

7. The system of claim 5, wherein registration, activation and authentication for each service provider occurs via a single data service.

8. The system according to claim 4, wherein registration occurs using an agent registration service.

9. The system of claim 8, wherein activation occurs using a fixed wireless node.

10. The system of claim 9, wherein authentication occurs in the distributed service network.

11. The system of claim 1, further comprising:
    a virtual private network tunnel connection entry that is automatically configured for each service provider in a windows dial-up networking scenario.

12. The system of claim 1, wherein the client application provides a plurality of high-speed data related tools.

13. The system of claim 12, wherein the plurality of high-speed data related tools comprise at least one of a support tool, a diagnostics tool, an alert tool, an updating tool, an access tool, a service provider choice tool and a messaging tool.

14. The system of claim 13, wherein the computer user may select the service provider from a plurality of available service providers sing a service provider selection tool.

* * * * *